(12) United States Patent
He et al.

(10) Patent No.: US 11,007,739 B2
(45) Date of Patent: May 18, 2021

(54) PRESSING MACHINE AND CORRESPONDING SIDE PLATE UNIT STRUCTURE

(71) Applicants: (SUZHOU JIANGNAN AEROSPACE MECHANICAL & ELECTRICAL INDUSTRY CO. LTD), Jiangsu (CN); (JANGNAN UNIVERSITY), Jiangsu (CN)

(72) Inventors: Biao He, Suzhou (CN); Wei Chen, Suzhou (CN); ChaoFeng Zhang, Suzhou (CN); FengChao Shen, Suzhou (CN); TongFei Jiang, Suzhou (CN); JiaJia Zhu, Suzhou (CN); WeiLi Wang, Suzhou (CN); HaiJun Wang, Suzhou (CN)

(73) Assignee: SUZHOU JIANGNAN AEROSPACE MECHANICAL & ELECTRICAL INDUSTRY CO., LTD.

( * ) Notice: Subject to any disclaimer, the term of this patent is extended or adjusted under 35 U.S.C. 154(b) by 282 days.

(21) Appl. No.: 16/095,688

(22) PCT Filed: Jul. 7, 2017

(86) PCT No.: PCT/CN2017/092154
§ 371 (c)(1),
(2) Date: Oct. 22, 2018

(87) PCT Pub. No.: WO2018/214247
PCT Pub. Date: Nov. 29, 2018

(65) Prior Publication Data
US 2020/0316893 A1    Oct. 8, 2020

(30) Foreign Application Priority Data
May 24, 2017   (CN) .......................... 201710371993.7

(51) Int. Cl.
*B30B 1/42*        (2006.01)
*B30B 15/06*       (2006.01)
(Continued)

(52) U.S. Cl.
CPC .............. *B30B 1/42* (2013.01); *B30B 15/064* (2013.01); *B30B 15/34* (2013.01); *B32B 37/06* (2013.01); *B32B 37/10* (2013.01)

(58) Field of Classification Search
CPC ........... B30B 1/42; B30B 7/04; B30B 15/064; B30B 15/34; B30B 9/28; B30B 11/007;
(Continued)

(56) References Cited

U.S. PATENT DOCUMENTS 4,298,323 A * 11/1981 Haydt, Jr. ............... B29C 44/58
425/162
5,037,498 A *  8/1991 Umeda .................... B29C 31/00
156/307.3

(Continued)

*Primary Examiner* — Teresa M Ekiert
*Assistant Examiner* — Jared O Brown

(57) ABSTRACT

A pressing machine comprising a base, wherein a first inner edge side plate and a second outer edge side plate are arranged on the base; a clamping chamber with sealed inner and outer end surfaces is reserved between the outer wall of the first inner edge side plate and the inner wall of the of the second outer edge side plate; the interior of the clamping chamber is used for preparing sandwich panels; the first inner edge side plate comprises a first side plate assembly, a second side plate assembly, a third side plate assembly and a fourth side plate assembly, wherein the four groups of the side plate assemblies are arranged in parallel in pairs; each side plate assembly is formed by assembling a plurality of side plate units along the length direction of the corresponding side plate assembly.

10 Claims, 6 Drawing Sheets

(51) Int. Cl.
*B30B 15/34* (2006.01)
*B32B 37/06* (2006.01)
*B32B 37/10* (2006.01)

(58) Field of Classification Search
CPC ....... B30B 11/02; B30B 11/027; B30B 12/00; B30B 13/00; B30B 15/04; B32B 37/06; B32B 37/10; B32B 37/1081; B29C 65/785; B29C 66/81; B29C 66/8244
USPC ...... 100/311, 315, 324, 325, 326; 156/583.1
See application file for complete search history.

(56) References Cited

U.S. PATENT DOCUMENTS

| 2011/0006460 | A1* | 1/2011 | Vander Wel | ............ | B29C 43/36 |
| | | | | | 264/403 |
| 2015/0266215 | A1* | 9/2015 | Mullininx | ............ | B29C 44/388 |
| | | | | | 264/46.5 |

* cited by examiner

PRESSING MACHINE AND CORRESPONDING SIDE PLATE UNIT STRUCTURE

TECHNICAL FIELD OF THE INVENTION

The present invention relates to the technical field of manufacturing sandwich panels of shelters, and more particularly, to a pressing machine and a corresponding side plate unit structure.

BACKGROUND OF THE INVENTION

In the prior art, the process of manufacturing sandwich panels of shelters requires corresponding mechanical clamping force and heating temperature. However, the necessary mechanical clamping mechanism and heating mechanism inevitably leads to a complicated structure. Moreover, the traditional pressing machine can't be used to directly generate a shelter body. Thus, it's urgent for those skilled in this field to develop a novel pressing machine.

SUMMARY OF THE INVENTION

The purpose of the present invention is to solve the shortcomings in the prior art by providing a pressing machine and a corresponding side plate unit structure. According to the present invention, the inner sheet and the outer sheet of the sandwich panel are placed into the clamping chamber of the present invention, and the space between the inner sheet and the outer sheet is filled with a filling compound. After the electromagnetic module and the corresponding heating module are initiated, an electromagnetic absorption force is formed between the inner sheet and the outer sheet. As a result, the inner sheet, the filling compound and the outer sheet are tightly integrated, and a proper pressing temperature can be kept. Furthermore, the side plate of the present invention is formed by assembling a plurality of groups of side plate units. Thus, sandwich panels with different sizes can be manufactured.

To achieve the above purpose, the present invention adopts the following technical solution:

A pressing machine comprising a base, wherein a first inner edge side plate and a second outer edge side plate are arranged on the base; a clamping chamber with sealed inner and outer end surfaces is reserved between the outer wall of the first inner edge side plate and the inner wall of the of the second outer edge side plate; the interior of the clamping chamber is used for preparing sandwich panels; the first inner edge side plate comprises a first side plate assembly, a second side plate assembly, a third side plate assembly and a fourth side plate assembly, wherein the four groups of the side plate assemblies are arranged in parallel in pairs; each side plate assembly is formed by assembling a plurality of side plate units along the length direction of the corresponding side plate assembly; each side plate unit comprises a heating module, an electromagnetic module and an insulating isolation module, wherein the insulating isolation module is located between the heating module and the electromagnetic module; the heating modules that are located between the adjacent side plate units are connected with each other, and the electromagnetic modules that are located between the adjacent side plate units are connected with each other.

In another preferred embodiment, a positioning threaded structure that protrudes inwards is arranged on the inner wall of the side plate unit, and a positioning threaded column is arranged on the base and corresponds to the positioning threaded structure. The bottom of a square column is in threaded connection with the positioning threaded column, and a threaded through-hole is formed in the positioning threaded column that corresponds to the square column. A bolt is in threaded connection with the corresponding threaded through-hole and the positioning threaded column. The adjacent side plate units are fixed to the base, and the adjacent side plates are in tight and seamless connection.

In another preferred embodiment, two positioning threaded columns that protrude inwards are arranged up and down on the inner wall of each side plate unit, thereby enabling the side plate units to be stably positioned.

In another preferred embodiment, the two ends of each side plate assembly are respectively provided with a corner side plate unit, and the outer end of each corner side plate unit is cut off by 45 degrees. The adjacent side plate assemblies are connected through assembling corresponding corner side plate units.

In another preferred embodiment, a connecting square column that is fixed on the base and corresponds to the corner side plate unit is provided with two vertical-direction threaded through-holes. A first bolt and a second bolt are respectively in threaded connection with the corresponding threaded through-holes and the positioning threaded structures that correspond to the corner side plate unit.

In another preferred embodiment, the side plate unit comprises a heating module, an electromagnetic module and an insulating isolation module, wherein the insulating isolation module is located between the heating module and the electromagnetic module. The heating module comprises a heating coil, a heating coil slotted plate and a heating layer cover. A heating coil slot is formed in the heating coil slotted plate, and the heating coil is arranged in the heating coil slot. The heating layer cover covers the outer end surface of the heating coil slotted plate. The insulating isolation module is an electromagnetic isolation plate. The electromagnetic module comprises electromagnetic coils, an electromagnetic coil slotted plate and an electromagnetic layer cover. A plurality of electromagnetic coil slots is formed in the electromagnetic coil slotted plate, and the electromagnetic coils are embedded in the corresponding electromagnetic coil slots. The adjacent electromagnetic coils are connected in series, and the electromagnetic layer cover covers the outer end surface of the electromagnetic coil slotted plate. The two end surfaces of the electromagnetic isolation plate are respectively bonded with the inner end surface of the heating coil slotted plate and the inner end surface of the electromagnetic coil slotted plate.

In another preferred embodiment, heating coil outward-extending slots that respectively face the adjacent side plate units are formed in the heating coil slotted plate. The match line of the heating coil is connected with the heating coil of the adjacent side plate unit through the corresponding heating coil outward-extending slot.

In another preferred embodiment, an electromagnetic coil inward-extending slot that is located between the adjacent electromagnetic coils of the same side plate unit is formed in the electromagnetic coil slotted plate. The adjacent electromagnetic coils in the same side plate unit are connected in series through the conductors located between the corresponding electromagnetic coil inward-extending slots. The electromagnetic coil slot formed in one end of the electromagnetic coil slotted plate is provided with an electromagnetic coil outward-extending slot that faces the adjacent side plate unit on one side. The electromagnetic coil slot formed in the other end of the electromagnetic coil slotted plate is
} provided with an electromagnetic coil outward-extending slot that faces the adjacent side plate unit on the other side. The electromagnetic coils that are connected in series with the adjacent side plate units through the conductors are placed into the two electromagnetic coil outward-extending slots.

In another preferred embodiment, the electromagnetic module is located on the inner wall of the electromagnetic isolation plate, and the heating module is located on the outer wall of the electromagnetic isolation plate. The positioning threaded structure that protrudes inwards is arranged on the inner wall of the electromagnetic layer cover. The electromagnetic isolation plate does not affect the electromagnetic absorption force generated by the electromagnetic module between the core layer and the skin layers of sandwich panels.

In another preferred embodiment, one side of the inner wall of the electromagnetic isolation plate is provided with an inner spigot, and the other side of the outer wall of the electromagnetic isolation plate is provided with an outer spigot. The electromagnetic module is tightly attached to the end surface of the inner wall of the electromagnetic isolation plate, and the heating module is tightly attached to the end surface of the outer wall of the electromagnetic isolation plate. Thus, the adjacent side plate units can be quickly aligned and assembled, achieving a fast and convenient assembly process.

Compared with the prior art, the present invention has the following advantages:

The inner sheet and the outer sheet of the sandwich panel are placed into the clamping chamber of the present invention, and the space between the inner sheet and the outer sheet is filled with a filling compound. After the electromagnetic module and the corresponding heating module are initiated, an electromagnetic absorption force is formed between the inner sheet and the outer sheet of the sandwich panel. As a result, the inner sheet, the filling compound and the outer sheet are tightly integrated, and a proper pressing temperature can be kept. Furthermore, the side plate of the present invention is formed by assembling a plurality of groups of side plate units. Therefore, the pressing machine of the present invention is capable of manufacturing sandwich panels with different sizes. According to this design, shelter body can be prepared at one step, achieving a low manufacturing cost.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

Base 1, The First Inner Edge Plate 2, The First Side Plate Assembly 21, The Second Side Plate Assembly 22, The Third Side Plate Assembly 23, The Fourth Side Plate Assembly 24, The Second Outer Edge Side Plate 3, Clamping Chamber 4, Side Plate Unit 5, Corner Side Plate unit 51, Heating Module 6, Heating Coil 61, Heating Coil Slotted Plate 62, Heating Layer Cover 63, Heating Coil Slot 64, Heating Coil End Outward-extending Slot 65, Electromagnetic Module 7, Electromagnetic Coil 71, Middle Electromagnetic Coil 711, Electromagnetic Coil Slotted Plate 72, Electromagnetic Layer Cover 73, Electromagnetic Coil Slot 74, Electromagnetic Coil Inward-extending Slot 75, Electromagnetic Coil Outward-extending Slot 76, Insulating Isolation Module 8, Inner Spigot 81, Outer Spigot 82, Positioning Threaded Structure 9, Positioning Threaded Column 10, Square Column 11, Connecting Square Column 111, Bolt 12, The First Bolt 121, The Second Bolt 122

DETAILED DESCRIPTION OF THE INVENTION

Drawings and detailed embodiments are combined hereinafter to elaborate the technical principles of the present invention.

Figure 1:
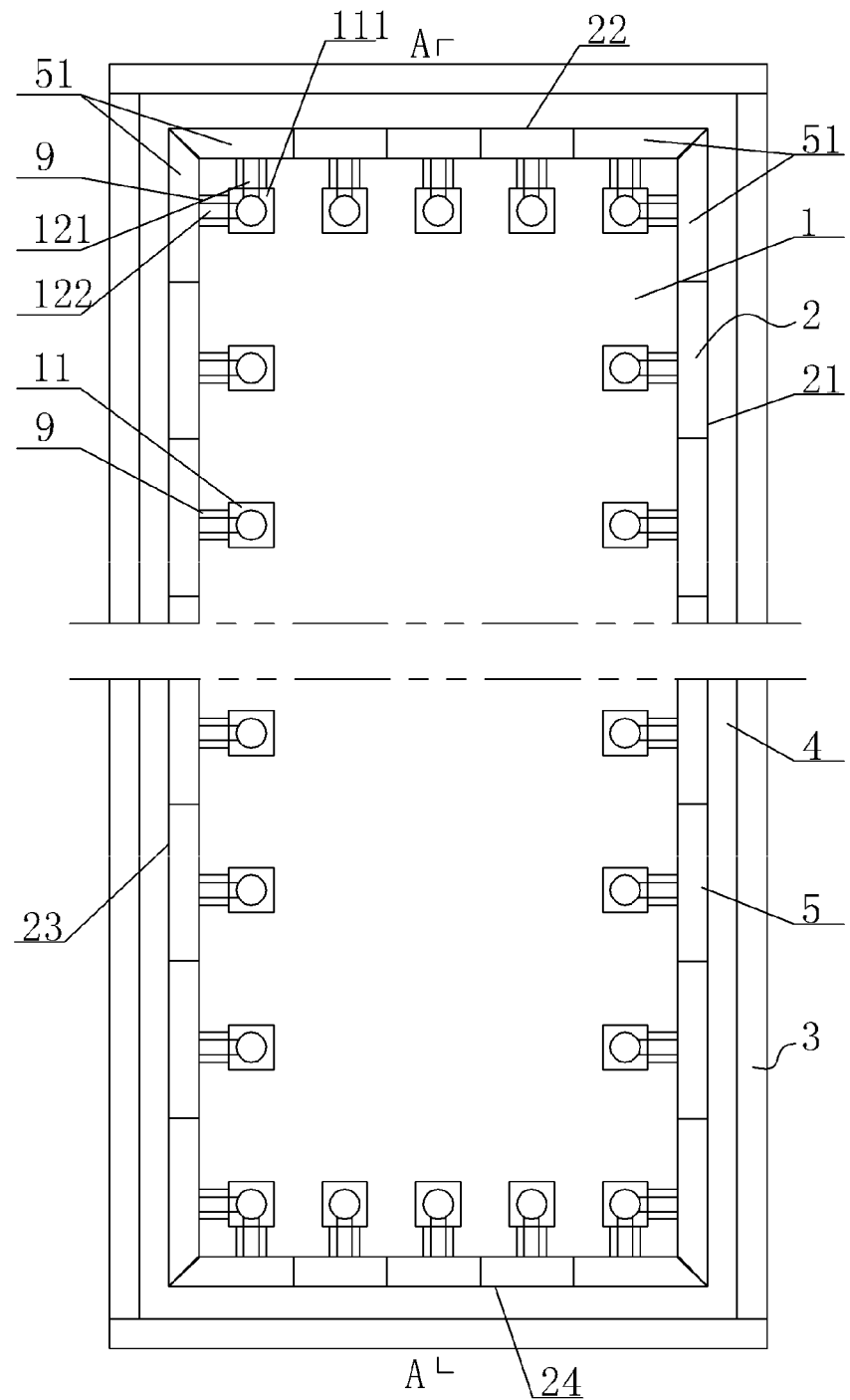
FIG. 1 is a top view of the pressing machine of the present invention.
Figure 2:
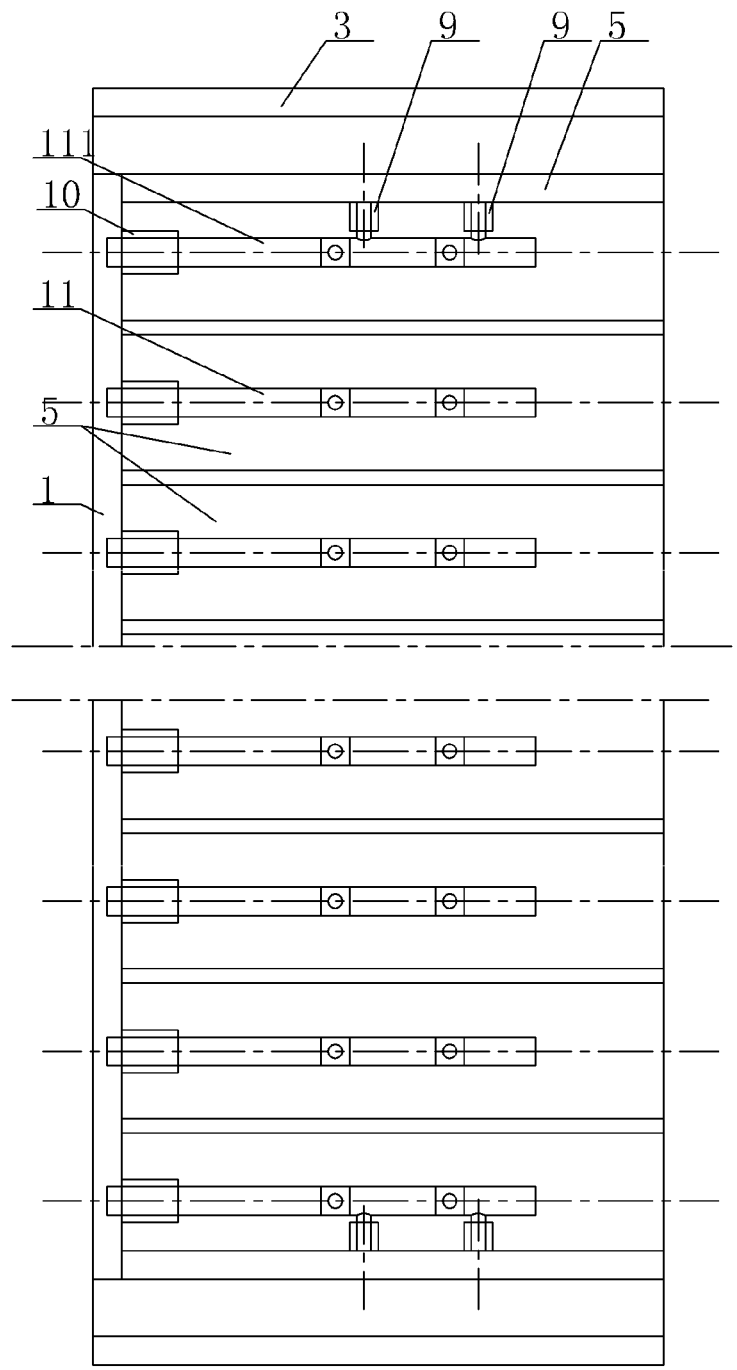
FIG. 2 is a sectional view along line A-A in FIG. 1.
Figure 3:
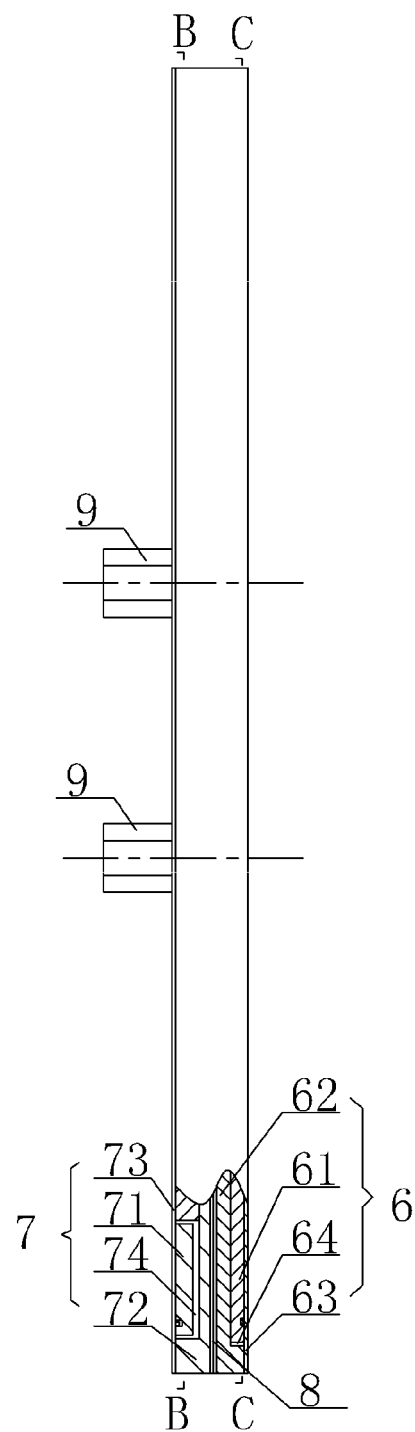
FIG. 3 is a front view of the side plate unit structure of the present invention.
Figure 4:
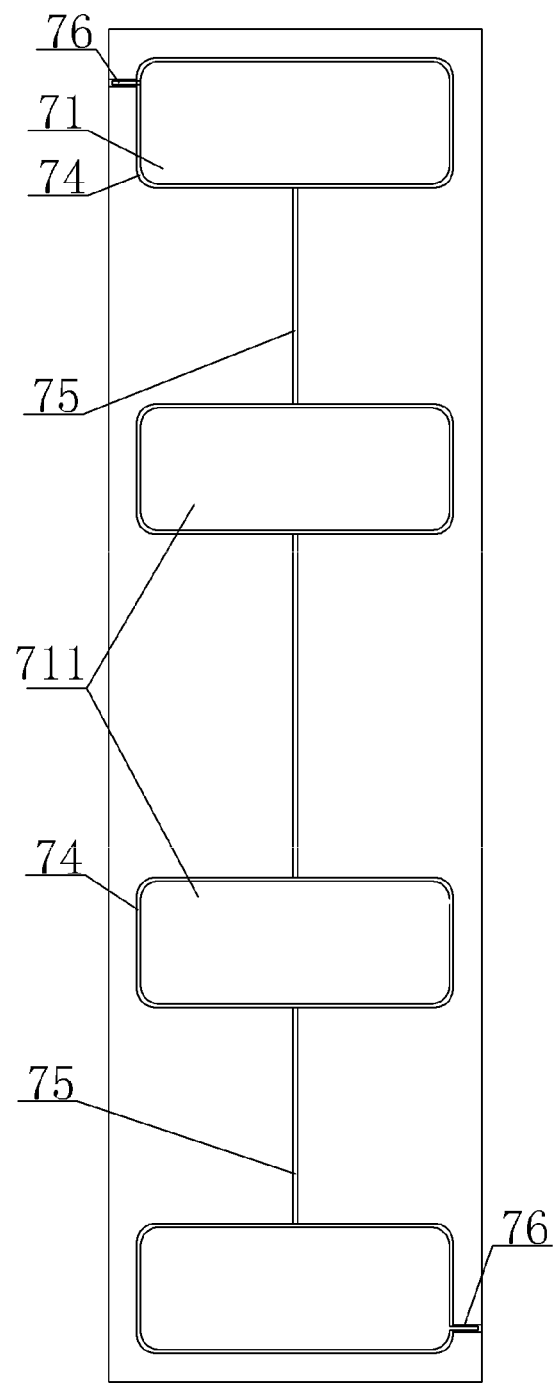
FIG. 4 is a side view of FIG. 3.
Figure 5:
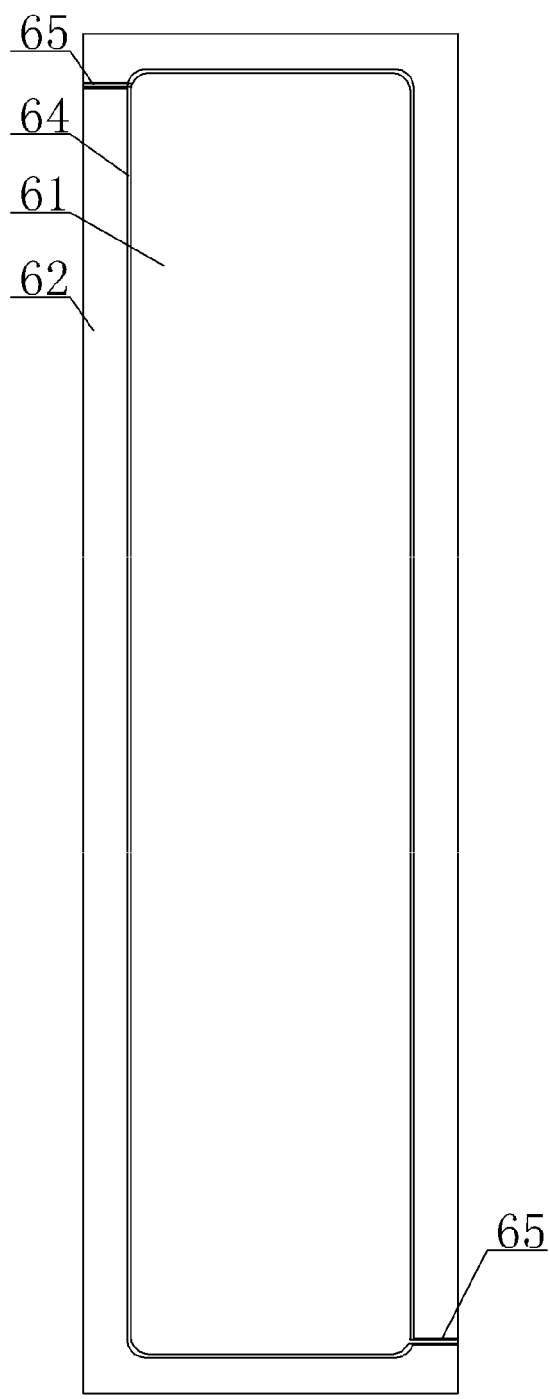
FIG. 5 is sectional view along line B-B in FIG. 3.
Figure 6:
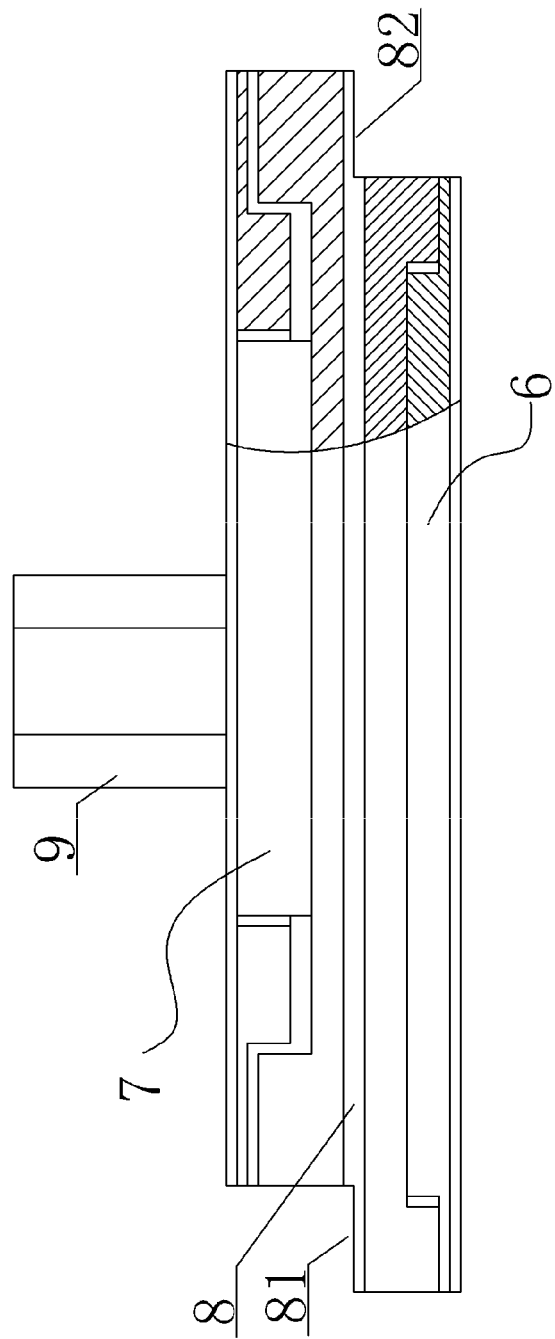
FIG. 6 is a sectional view along line C-C in FIG. 3.

As shown in FIGS. 1-6, a pressing machine comprises a base 1, wherein a first inner edge side plate 2 and a second outer edge side plate 3 are arranged on the base 1. A clamping chamber 4 with sealed inner and outer end surfaces is reserved between the outer wall of the first inner edge side plate 2 and the inner wall of the of the second outer edge side plate 3. The interior of the clamping chamber 4 is used for preparing sandwich panels. The first inner edge side plate 2 comprises a first side plate assembly 21, a second side plate assembly 22, a third side plate assembly 23 and a fourth side plate assembly 24, wherein the four groups of the side plate assemblies are arranged in parallel in pairs. Each side plate assembly is formed by assembling a plurality of side plate units 5 along the length direction of the corresponding side plate assembly. Each side plate unit 5 comprises a heating module 6, an electromagnetic module 7 and an insulating isolation module 8, wherein the insulating isolation module 8 is located between the heating module 6 and the electromagnetic module 7. The heating modules 6 that are located between the adjacent side plate units 5 are connected with each other, and the electromagnetic modules 7 that are located between the adjacent side plate units 5 are connected with each other.

A positioning threaded structure 9 that protrudes inwards is arranged on the inner wall of the side plate unit 5, and a positioning threaded column 10 is arranged on the base 1 and corresponds to the positioning threaded structure 9. The bottom of a square column 11 is in threaded connection with the positioning threaded column 10, and a threaded through-hole is formed in the positioning threaded column 10 that corresponds to the square column 11. A bolt 12 is in threaded connection with the corresponding threaded through-hole and the positioning threaded column 10. Therefore, the adjacent side plate units 5 are fixed to the base 1, and are in tight and seamless connection.

In this embodiment, two positioning threaded columns 10 that protrude inwards are arranged up and down on the inner wall of each side plate unit 5, thereby enabling the side plate units 5 to be stably positioned.

The two ends of each side plate assembly are respectively provided with a corner side plate unit 51, and the outer end of each corner side plate unit 51 is cut off by 45 degrees. The adjacent side plate assemblies are connected through assembling corresponding corner side plate units 51.

A connecting square column 111 that is fixed on the base 1 and corresponds to the corner side plate unit 51 is provided with two vertical-direction threaded through-holes. A first bolt 121 and a second bolt 122 are respectively in threaded connection with the corresponding threaded through-holes and the positioning threaded structures that correspond to the corner side plate unit 51.

As shown in FIGS. 3-6, the side plate unit 5 comprises a heating module 6, an electromagnetic module 7 and an insulating isolation module 8, wherein the insulating isolation module 8 is located between the heating module 6 and the electromagnetic module 7. Specifically, the heating module 6 comprises a heating coil 61, a heating coil slotted plate 62 and a heating layer cover 63. A heating coil slot 64 is formed in the heating coil slotted plate 62, and the heating coil 61 is arranged in the heating coil slot 64. The heating layer cover 63 covers the outer end surface of the heating coil slotted plate 62. Specifically, the insulating isolation module 8 is an electromagnetic isolation plate. The electromagnetic module 7 comprises electromagnetic coils 71, an electromagnetic coil slotted plate 72 and an electromagnetic layer cover 73. A plurality of electromagnetic coil slots 74 is formed in the electromagnetic coil slotted plate 72, and the electromagnetic coils 71 are embedded in the corresponding electromagnetic coil slots 74. The adjacent electromagnetic coils 71 are connected in series, and the electromagnetic layer cover 73 covers the outer end surface of the electromagnetic coil slotted plate 72. The two end surfaces of the electromagnetic isolation plate are respectively bonded with the inner end surface of the heating coil slotted plate 62 and the inner end surface of the electromagnetic coil slotted plate 72.

The heating coil 61, the heating coil slotted plate 62 and the heating layer cover 63 are tightly bonded through a strong bonding agent. Thus, the disengagement can be avoided during the pressing process, and a tight structure of the heating module 6 can be achieved.

The electromagnetic coils 71, the electromagnetic coil slotted plate 72 and the electromagnetic layer cover 73 are tightly bonded (same as the heating module) through a strong bonding agent. Therefore, the disengagement can be prevented from occurring during the pressing process, achieving a tight structure of the electromagnetic module 6.

Furthermore, heating coil outward-extending slots 65 that respectively face the adjacent side plate units 5 are formed in the heating coil slotted plate 62. The match line of the heating coil 61 is connected with the heating coil 61 of the adjacent side plate unit 5 through the corresponding heating coil outward-extending slot 65.

The heating coil 61 is mounted and fixed in the heating coil slotted plate 62 according to the size and the matching relation, enabling the outward-extending ends of the heating coil to be correctly placed in the outward-extending slots. Thus, the heating coil of one side plate unit 5 can be connected with that of the other side plate unit 5. The heating coil is mixed with the filling compound to form an integral structure so that the heating coil cannot be scattered. The heating coil is mainly made of resistance wire, and is capable of generating heat after being electrified. The heat is displayed in the form of temperature, which can be increased along the increase of the current. Namely, the temperature can be controlled through adjusting the current. In this way, the heating temperature required by the pressing process can be guaranteed, and a continuous heat preservation effect can be achieved.

In principle, as the heating coil is made of resistance wire, the electromagnetic effect cannot be produced after the heating coil is electrified. Practically, a weak magnetic effect can also be produced so that the electromagnetic effect of the electromagnetic module can be enhanced.

The heating layer cover 63 is mainly used to cover the heating coil 61 in the heating coil slotted plate 62. Thus, the heating coil 61 can be prevented from falling off.

An electromagnetic coil inward-extending slot 75 that is located between the adjacent electromagnetic coils 71 of the same side plate unit 5 is formed in the electromagnetic coil slotted plate 72. The adjacent electromagnetic coils 71 in the same side plate unit 5 are connected in series through the conductors located between the corresponding electromagnetic coil inward-extending slots 75. The electromagnetic coil slot 74 formed in one end of the electromagnetic coil slotted plate 72 is provided with an electromagnetic coil outward-extending slot 76 that faces the adjacent side plate unit 5 on one side. The electromagnetic coil slot 74 formed in the other end of the electromagnetic coil slotted plate 72 is provided with an electromagnetic coil outward-extending slot 76 that faces the adjacent side plate unit 5 on the other side. The electromagnetic coils 71 that are connected in series with the adjacent side plate units 5 through the conductors are placed into the two electromagnetic coil outward-extending slots 76.

All parts of the electromagnetic module 7 are assembled in sequence according to the size and the matching relation. The electromagnetic coils 71 are fixed in the electromagnetic coil slotted plate 72. As the electromagnetic module of the side plate unit comprises at least three coil layers, the outward-extending ends of the electromagnetic coils 72 located at the two ends of the electromagnetic coil slotted plate 72 must be correctly placed in the electromagnetic coil outward-extending slots 76, thereby ensuring that the electromagnetic coils of adjacent side plate units 5 can be correctly connected.

After the middle electromagnetic coils 711 are placed, the inward-extending ends of the middle electromagnetic coils 71 must be correctly placed in the electromagnetic coil inward-extending slots 75, thereby ensuring that the middle electromagnetic coils can be correctly connected with the electromagnetic coils at the two ends.

Similar to the heating coil, the electromagnetic coils are mixed with the filling compound to form an integral structure, thereby preventing the electromagnetic coils from being scattered. Thus, a high stability of the electromagnetic module can be achieved.

The iron core of the electromagnetic coil is made of soft iron, which cannot be made of steel. That's because steel remains a magnetic property for a long time after being magnetized and cannot be demagnetized. As a result, the magnetism of the electromagnet cannot be controlled through regulating the current so that the advantages of the electromagnet can be lost. The iron core is generally made of not pure iron but ferroferric oxide. The iron core in the electromagnet is used for increasing the magnetism of the magnet, which can also be made of other metal oxides such as manganese and cobalt. The greater the magnetic conductivity is, the larger the magnetic field is. As the magnetic conductivity of other metals is lower than that of iron, other metals are usually not adopted as the core material. The most frequently used materials are iron alloys, such as novel manganese zinc ferrite materials. Their magnetic conductivity is about 18000.

The electromagnetic coil 71 is mainly made of copper wire with moderate thickness. The magnetic field can be generated after the copper wire is electrified. The intensity of the magnetic field can be greatly enhanced under the action of the iron core. The intensity of the magnetic field is mainly displayed in the form of magnetic adsorption capacity, which can be increased along the increase of the current. Namely, the magnetic adsorption capacity can be controlled through regulating the current. Therefore, during the pressing process of sandwich panels, a necessary pressing force can be ensured, and a continuous pressing effect can be achieved.

After being electrified, the electromagnetic coil 71 generates a magnetic field. The intensity of the magnetic field is directly restricted by the number of the coil turns. Theoretically, the number of the coil turns is about 300-500.

The electromagnetic layer cover 73 is mainly used to cover the electromagnetic coils 71 in the electromagnetic coil slotted plate 72. Thus, the electromagnetic coils 71 can be prevented from falling off during operation.

In this embodiment, the electromagnetic module 7 is located on the inner wall of the electromagnetic isolation plate, and the heating module 6 is located on the outer wall of the electromagnetic isolation plate. The positioning threaded structure 9 that protrudes inwards is arranged on the inner wall of the electromagnetic layer cover 73. The electromagnetic isolation plate does not affect the electromagnetic absorption force generated by the electromagnetic module 7 between the inner sheet and the outer sheet of sandwich panels.

One side of the inner wall of the electromagnetic isolation plate is provided with an inner spigot 81, and the other side of the outer wall of the electromagnetic isolation plate is provided with an outer spigot 82. The electromagnetic module 7 is tightly attached to the end surface of the inner wall of the electromagnetic isolation plate, and the heating module 6 is tightly attached to the end surface of the outer wall of the electromagnetic isolation plate. Thus, the adjacent side plate units 5 can be quickly aligned and assembled, achieving a fast and convenient assembly process.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A pressing machine, comprising:
a base,
a first inner edge side plate and a second outer edge side plate, a clamping chamber disposed between an outer wall of the first inner edge side plate and an inner wall of the second outer edge side plate, wherein an interior of the clamping chamber is used for preparing sandwich panels, wherein the first inner edge side plate comprises a first side plate assembly,
a second side plate assembly,
a third side plate assembly and
a fourth side plate assembly,
wherein the first side plate assembly, the second side plate assembly, the third side plate assembly, and the fourth side plate assembly, each are arranged in parallel in pairs, wherein each of said side plate assemblies is formed by assembling a plurality of side plate units along the corresponding side plate assembly, wherein each of the side plate units comprises a heating module, an electromagnetic module and an insulating isolation module, wherein the insulating isolation module is located between the heating module and the electromagnetic module, wherein each of the heating modules in each of the side plate units is connected to a corresponding one of the heating modules located in an adjacent one of the side plate units, and wherein each of the electromagnetic modules is connected to a corresponding one of the electromagnetic modules located in the adjacent one of the side plate units.

2. The pressing machine of claim 1, further comprising a positioning threaded structure that protrudes inwards and arranged on an inner wall of each of the side plate units, a positioning threaded column arranged on the base and corresponds to the positioning threaded structure, a square column in threaded connection with the positioning threaded column, a threaded through-hole formed in the positioning threaded column that corresponds to the square column, and a bolt in threaded connection with the threaded through-hole and the positioning threaded column.

3. The pressing machine of claim 2, further comprising two positioning threaded columns that protrude inwards arranged on the inner wall of each of the plurality of side plate units.

4. The pressing machine of claim 3, wherein the two ends of each of the first, second, third and fourth side plate assembly are respectively provided with a corner side plate unit, and an outer end of each corner side plate unit is cut off at a 45 degree angle, wherein each of the first second, third and fourth side plate assemblies are connected to an adjacent side plate assembly through the corner side plate units.

5. The pressing machine of claim 4, further comprising a connecting square column that is fixed on the base and provided with two vertical-direction threaded through-holes, a first bolt and a second bolt in threaded connection with the two vertical-direction threaded through-holes and the positioning threaded structure.

6. A side plate unit structure, comprising:
a heating module,
an electromagnetic module, and
an insulating isolation module,
wherein the insulating isolation module is located between the heating module and the electromagnetic module, wherein the heating module comprises a heating coil, a heating coil slotted plate and a heating layer cover, wherein a heating coil slot is formed in the heating coil slotted plate, and the heating coil is arranged in the heating coil slot, wherein the heating layer cover covers an outer end surface of the heating coil slotted plate, wherein the insulating isolation module is an electromagnetic isolation plate, wherein the electromagnetic module comprises a plurality of electromagnetic coils, an electromagnetic coil slotted plate and an electromagnetic layer cover, wherein a plurality of electromagnetic coil slots is formed in the electromagnetic coil slotted plate, and each of the electromagnetic coils are embedded in corresponding ones of the plurality of electromagnetic coil slots, wherein adjacent ones of the plurality of electromagnetic coils are connected in series, and the electromagnetic layer cover covers the outer end surface of the electromagnetic coil slotted plate, wherein the two end surfaces of the electromagnetic isolation plate are respectively bonded with an inner end surface of the heating coil slotted plate and an inner end surface of the electromagnetic coil slotted plate.

7. The side plate unit structure of claim 6, further comprising a plurality of heating coil outward-extending slots, and a match line of the heating coil extends through at least one of the plurality of heating coil outward-extending slots for connecting with another heating coil of an adjacent side plate unit structure.

8. The side plate unit structure of claim 6, further comprising electromagnetic coil inward-extending slots that are located between the adjacent ones of the plurality of electromagnetic coils and are formed in the electromagnetic coil slotted plate, wherein the adjacent ones of the plurality of electromagnetic coils are connected in series through conductors located in the electromagnetic coil inward-extending slots, wherein one of the plurality of electromagnetic coil slots is provided with a first electromagnetic coil outward-extending slot at a first end of the electromagnetic coil slotted plate, and another one of the plurality of electromagnetic coil slots is formed in a second end of the electromagnetic coil slotted plate and is provided with a second electromagnetic coil outward-extending slot, wherein the adjacent ones of the plurality of electromagnetic coils that are connected in series through the conductors are placed into the one and the another one of the plurality of electromagnetic coil slots having the first and second electromagnetic coil outward-extending slots.

9. The side plate unit structure of claim 6, wherein the electromagnetic module is located on an inner wall of the electromagnetic isolation plate, and the heating module is located on an outer wall of the electromagnetic isolation plate, wherein a positioning threaded structure that protrudes inwards is arranged on the inner wall of the electromagnetic layer cover.

10. The side plate unit structure of claim 9, wherein one side of the inner wall of the electromagnetic isolation plate is provided with an inner spigot, and the outer wall of the electromagnetic isolation plate is provided with an outer spigot, wherein the electromagnetic module is attached to the end surface of the inner wall of the electromagnetic isolation plate, and the heating module is attached to the end surface of the outer wall of the electromagnetic isolation plate.

* * * * *